United States Patent
Wang (10) Patent No.: US 9,609,358 B2
(45) Date of Patent: Mar. 28, 2017

(54) PERFORMING VIDEO ENCODING MODE DECISIONS BASED ON DOWN-SCALED MACROBLOCK TEXTURE COMPLEXITY

(71) Applicant: ATI Technologies ULC, Markham (CA)

(72) Inventor: Jiao Wang, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 743 days.

(21) Appl. No.: 13/948,968

(22) Filed: Jul. 23, 2013

(65) Prior Publication Data
US 2015/0030082 A1   Jan. 29, 2015

(51) Int. Cl.
H04N 19/00 (2014.01)
H04N 19/59 (2014.01)
H04N 19/176 (2014.01)
H04N 19/147 (2014.01)
H04N 19/103 (2014.01)
H04N 19/14 (2014.01)
H04N 19/40 (2014.01)

(52) U.S. Cl.
CPC .......... *H04N 19/59* (2014.11); *H04N 19/103* (2014.11); *H04N 19/14* (2014.11); *H04N 19/147* (2014.11); *H04N 19/176* (2014.11); *H04N 19/40* (2014.11)

(58) Field of Classification Search
CPC ...... H04N 19/59; H04N 19/14; H04N 19/176; H04N 19/40
USPC .................................................. 375/240.24
See application file for complete search history.

(56) References Cited

U.S. PATENT DOCUMENTS

| 2011/0170595 A1* | 7/2011 | Shi | H04N 19/52 375/240.16 |
| 2013/0107960 A1* | 5/2013 | Ali | H04N 19/159 375/240.16 |

OTHER PUBLICATIONS

Ojala T, Pietikäinen M, Mäenpää T. Multiresolution gray-scale and rotation invariant texture classification with local binary patterns. Pattern Analysis and Machine Intelligence, IEEE Transactions on. Jul. 2002;24(7):971-87.*

Shen L, Liu Z, Yan T, Zhang Z, An P. Early SKIP mode decision for MVC using inter-view correlation. Signal Processing: Image Communication. Feb. 28, 2010;25(2):88-93.*

Wiegand et al. Overview of the H.264 / AVC Video Coding Standard, IEEE Transactions on Circuits and Systems for Video Technology, Jul. 2003, pp. 1-19.

ITU-T H.264, Advanced video coding for generic audiovisual services, Series H: Audiovisual and Multimedia Systems, Infrastructure of audiovisual services—Coding of moving video, Apr. 2013, Telecommunication Standardization Sector of ITU.

* cited by examiner

*Primary Examiner* — Jeffery Williams
(74) *Attorney, Agent, or Firm* — Volpe and Koenig, P.C.

(57) ABSTRACT

A method and apparatus are described for performing video encoding mode decisions in a video transcoding system. A down-scaled frame may be received that includes at least one macroblock. The down-scaled frame may be associated with a full-scale frame having a plurality of macroblocks that have been downsampled. A weighting factor and a distance measure factor may be determined for each of the macroblocks in the full-scale frame. Predicted blocks may be generated based on the weighting and distance measure factors.

19 Claims, 7 Drawing Sheets

| Encoding Mode | Weighting factor ($W_i$) |
|---|---|
| skip | 1 |
| inter 16x16 | 2 |
| inter 16x8 or inter 8x16 | 3 |
| inter 8x8 | 4 |
| inter 8x4 or inter 4x8 | 5 |
| inter 4x4 | 6 |
| intra 16x16 or intra 8x8 | 6 |
| intra 4x4 | 7 |

| Macroblock number ($MB_i$) | Distance measure factor ($D_i$) |
|---|---|
| $MB_1$ | $D_1 = 2$ |
| $MB_2$ | $D_2 = 2$ |
| $MB_3$ | $D_3 = 2$ |
| $MB_4$ | $D_4 = 2$ |
| $MB_5$ | $D_5 = 2$ |
| $MB_6$ | $D_6 = 1$ |
| $MB_7$ | $D_7 = 1$ |
| $MB_8$ | $D_8 = 2$ |
| $MB_9$ | $D_9 = 2$ |
| $MB_{10}$ | $D_{10} = 1$ |
| $MB_{11}$ | $D_{11} = 1$ |
| $MB_{12}$ | $D_{12} = 2$ |
| $MB_{13}$ | $D_{13} = 2$ |
| $MB_{14}$ | $D_{14} = 2$ |
| $MB_{15}$ | $D_{15} = 2$ |
| $MB_{16}$ | $D_{16} = 2$ |

PERFORMING VIDEO ENCODING MODE DECISIONS BASED ON DOWN-SCALED MACROBLOCK TEXTURE COMPLEXITY

TECHNICAL FIELD

The disclosed embodiments are generally directed to video processing techniques performed by an encoder.

BACKGROUND

H.264 is an advanced video coding (AVC) standard for video compression, and is currently one of the most commonly used formats for the recording, compression, and distribution of high definition video. Transcoding is the direct digital-to-digital data conversion of one encoding to another, such as for movie data files or audio files. This is typically performed in cases where a target device (or workflow) does not support the format or has limited storage capacity that mandates a reduced file size, or to convert incompatible or obsolete data to a better-supported or modern format. Transcoding may be performed at various times such as, for example, while files are being searched or when files are prepared for presentation.

H.264-based video transcoding with spatial resolution conversion may be performed by decoding a compressed bitstream, downsampling the decoded video sequence, and then encoding the down-scaled video data with an H.264 encoder. However, the encoding process associated with H.264-based video transcoding is highly complex. For example, a motion compensated prediction used during the encoding process may be time consuming and involve complex motion search and mode decision algorithms.

A coded video sequence in H-264/AVC consists of a sequence of coded pictures. Each coded picture may represent an entire frame or a single field. The coded picture is partitioned into fixed-size macroblocks that cover a rectangular picture area of samples. A macroblock typically consists of 16×16 or 8×8 samples, and is further subdivided into transform blocks, and may be further subdivided into prediction blocks.

In a typical encoding process, a rate distortion optimization technique may be used to determine encoding mode decision information, whereby for each macroblock, all supported encoding modes, (i.e., skip, inter 16×16, inter 16×8, inter 8×16, inter 8×8, inter 8×4, inter 4×8, inter 4×4, intra 16×16, intra 8×8 and intra 4×4), are considered to calculate the rate distortion cost and select the best mode which has the minimum rate distortion cost. However, this encoding process is significantly time consuming.

SUMMARY OF EMBODIMENTS

Some embodiments provide a method and apparatus for performing video encoding mode decisions in a video transcoding system. A down-scaled frame may be received that includes at least one macroblock. The down-scaled frame may be associated with a full-scale frame having a plurality of macroblocks that have been downsampled. A weighting factor and a distance measure factor may be determined for each of the macroblocks in the full-scale frame. Predicted blocks may be generated based on the weighting and distance measure factors.

Some embodiments provide a video encoder motion compensation unit. The motion compensation unit may include an input configured to receive a down-scaled frame including at least one macroblock. The down-scaled frame may be associated with a full-scale frame having a plurality of macroblocks that have been downsampled. The video encoder motion compensation unit may further include an output configured to generate predicted blocks based on weighting factors and distance measure factors determined for each of the macroblocks in the full-scale frame.

Some embodiments provide a non-transitory computer-readable storage medium configured to store a set of instructions that, when executed, configure a manufacturing process used to manufacture a semiconductor device. The semiconductor device may include an input configured to receive a down-scaled frame including at least one macroblock. The down-scaled frame may be associated with a full-scale frame having a plurality of macroblocks that have been downsampled. The semiconductor device may further include an output configured to generate predicted blocks based on weighting factors and distance measure factors determined for each of the macroblocks in the full-scale frame. The instructions may be Verilog data instructions or language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Embodiments are described for implementing a mode decision algorithm based on mode correlation, which utilizes prediction mode information from original full-scale scenes to predict the possible modes for down-scaled scenes in H.264-based homogeneous video transcoding.

Figure 1:
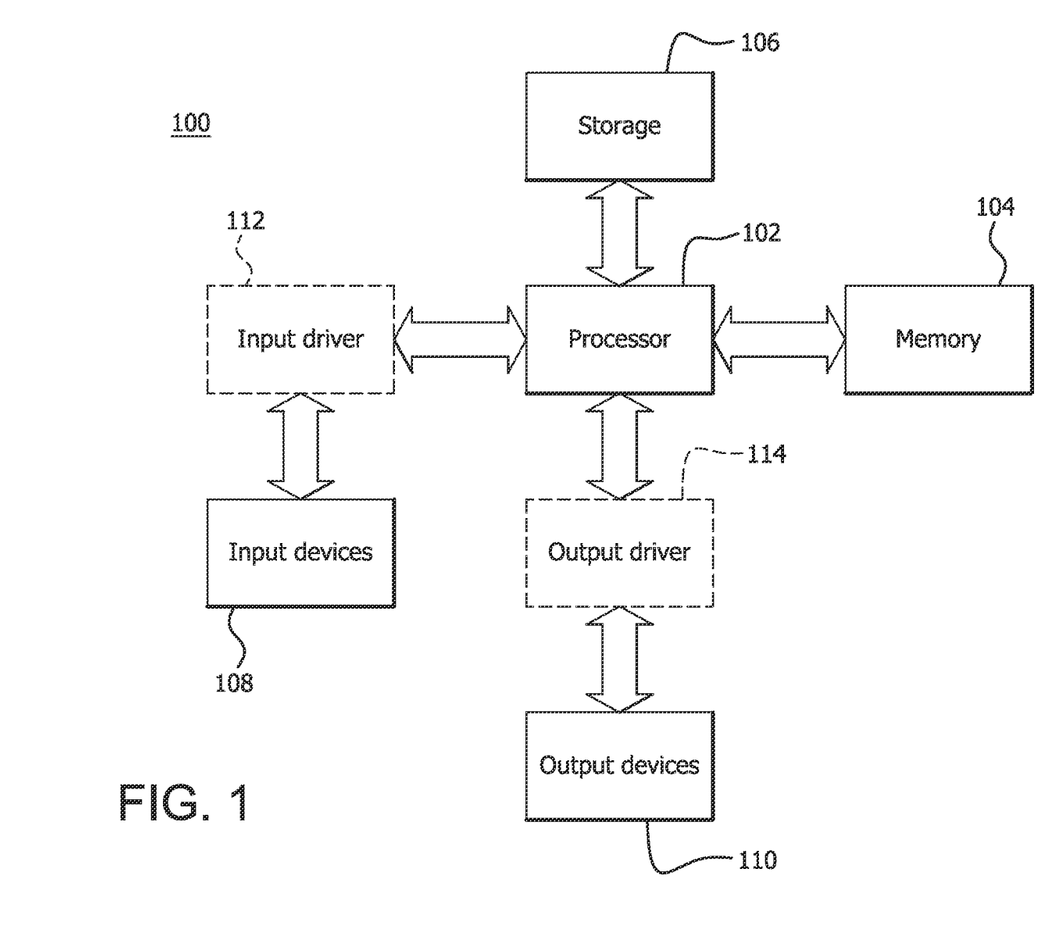
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102.

The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

H.264 based homogeneous video transcoding with spatial resolution conversion is described herein to support the wide adoption of H.264-based video transcoding and universal multimedia network access. A mode correlation based mode decision algorithm may be implemented, for example, by the processor 102 of FIG. 1, to utilize mode information from original full-scale scenes to efficiently predict the encoding modes for down-scaled scenes in order to speed up the encoding process, which in turn improves the overall transcoding performance.

The video color space used by H.264/AVC separates a color representation into a luma (i.e., luminance) component Y, which represents brightness, and chroma (i.e., chrominance) components Cb and Cr, which represent the extent to which the color deviates from gray towards blue and red, respectively.

Each macroblock may be transmitted in one of several coding types that support various predictive encoding modes. For example, intra-frame and inter-frame prediction modes may be used. An exhaustive rate distortion optimization process may be performed for each macroblock in down-scaled scenes to find its best prediction mode during the encoding process. Alternatively, the prediction modes may be blindly limited to avoid the exhaustive motion compensated prediction process during the encoding process, such as disabling inter sub-macroblock partition modes, (e.g., inter 8×4, inter 4×8 and inter 4×4), and/or turning off the small size intra prediction mode (intra 4×4). However, the video quality may be degraded as there may be some high motion and rich texture areas which need to be encoded using small prediction modes so as to keep more content details for visual quality.

In one embodiment, a mode decision algorithm based on mode correlation is implemented by utilizing prediction mode information from original full-scale scenes to predict the possible modes for down-scaled scenes in H.264-based homogeneous video transcoding. With the proposed mode decision method, motion search is performed only on the predicted modes, rather than all possible modes, to calculate the rate distortion cost. The most popular rate distortion optimization formulation uses the Lagrangian multiplier as follows:

$$J(m)=D(m)+\lambda*R(m);\qquad\text{Equation (1)}$$

where J(m) is the rate distortion cost for coding a macroblock in mode m, D(m) is the distortion between the original and the reconstructed macroblock, R is the total bits (rate) to encode the macroblock, and λ is the Lagrangian multiplier. The overall encoding time may be dramatically optimized with the proposed mode decision method, while keeping a high fidelity to the original exhaustive rate distortion optimization mechanism so as not to sacrifice quality or speed.

Figure 2:
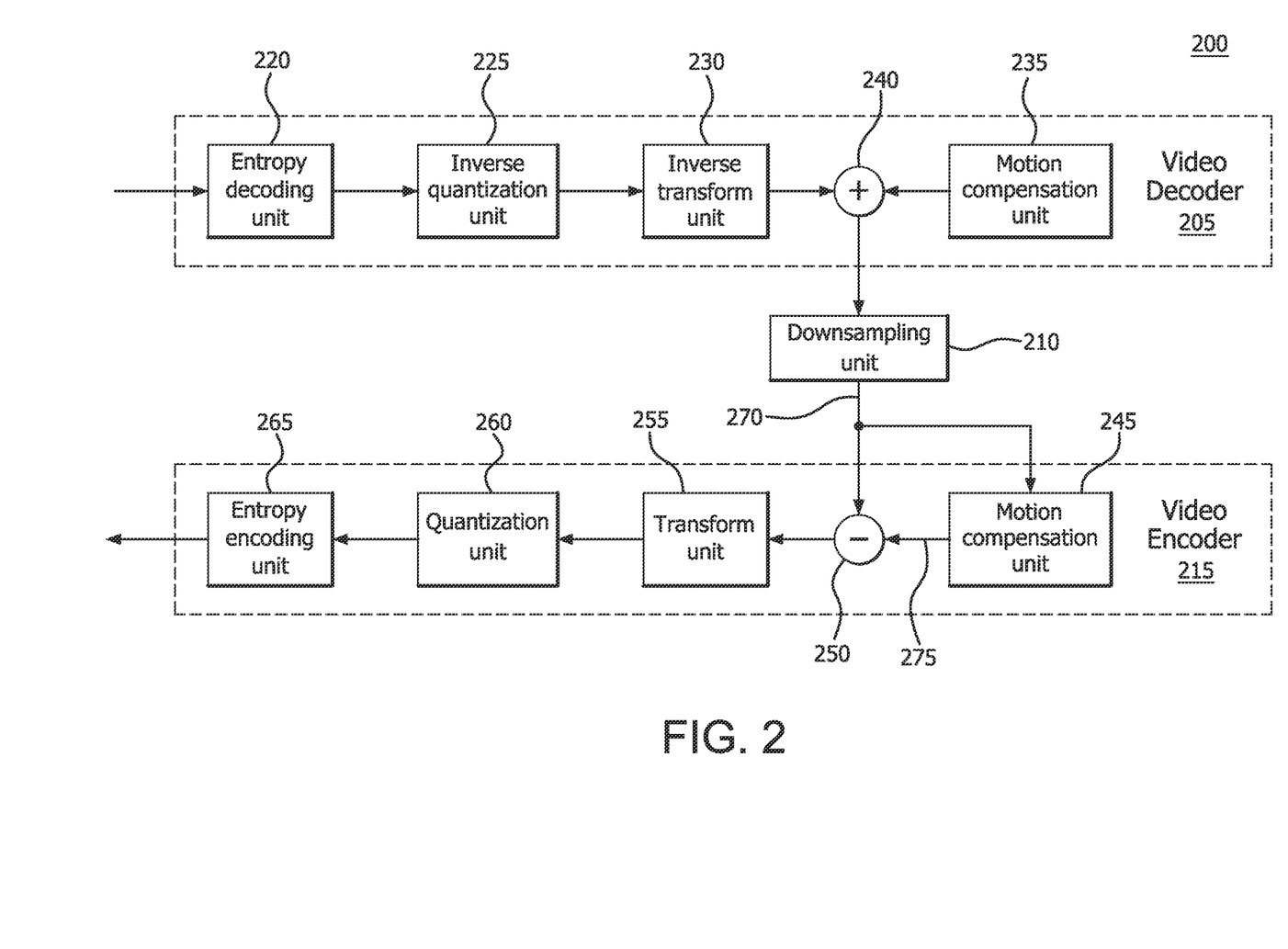
FIG. 2 shows an example of a video transcoding system in accordance with some embodiments.

FIG. 2 shows a video transcoding system 200 including a video decoder 205, a downsampling unit 210 and a video encoder 215. Each of the video decoder 205 and the video encoder 215 may include a processor in communication with a memory, similar to the processor 102 and the memory 104 shown in FIG. 1.

As shown in FIG. 2, the video decoder 205 includes an entropy decoding unit 220, an inverse quantization unit 225, an inverse transform unit 230, a motion compensation unit 235 and an adder 240. The video encoder 210 includes a motion compensation unit 245, a subtractor 250, a transform unit 255, a quantization unit 260 and an entropy encoding unit 265. The input 270 to the motion compensation unit 245 includes original input frames and reference frames. The motion compensation unit 245 performs inter/intra prediction and mode decisions to obtain the best prediction for a current coded macroblock. The input 270 may include down-scaled input and reference frames, as well as mode information associated with the corresponding full-scale frames. The motion compensation unit 245 outputs predicted blocks 275.

Still referring to FIG. 2, the subtractor 250 outputs the difference between the original blocks in the input 270 and the predicted blocks 275 to the transform unit 255, which performs a transform on pixel domain motion compensated residue data to generate transform domain residue in order to de-correlate the residue data. The quantization unit 260 further compresses the residue data in the transform domain. The entropy encoding unit 265 converts a series of symbols representing elements of the encoded video sequence into a compressed bitstream suitable for transmission or storage.

H.264-based video transcoding with spatial resolution conversion may be performed by the video decoder 205 decoding a compressed bitstream including at least one original full-scale frame to obtain mode information. The downsampling unit 210 downsamples a decoded video sequence received from the video decoder 205. The input 270 to the motion compensation unit 245 may correspond to the down-scaled frame. The motion compensation unit 245 encodes the input 270 and outputs predicted blocks 275.

In the case of homogeneous video transcoding from H.264 to H.264 with spatial resolution conversion, the mode information obtained from decoding the original full-scale frames and the mode information used to effectively compress the down-scaled frames are highly correlated. Typically, a bottleneck in transcoding may be caused by the video encoder 215 making motion compensated predictions for generating the predicted blocks 275. Hence, it is desired to utilize the mode information from the original compressed video to speed up the motion compensated prediction process of the encoding procedure for the down-scaled frames.

Motion compensation exploits the fact that, often, for many frames of a movie, the only difference between one frame and another is the result of either the camera moving or an object in the frame moving. In reference to a video file, much of the information that represents one frame will be the same as the information used in the next frame. Using motion compensation, a video stream may contain some full (reference) frames. Thus, the only information stored for the frames in between may be the information needed to transform the previous frame into the next frame.

In one embodiment, the prediction mode may be estimated by the motion compensation unit 245 of the video encoder 215 for each macroblock in the downsized frames by using the mode selection result of the original full-scale pictures, as opposed to a blind and independent rate distortion optimization on the original and the down-scaled scenes.

Statistical results show that most of the areas of motionless video content are predicted as skip mode and inter 16×16 mode in order to save coding bits. The probability of occurrence of skip and inter 16×16 modes in the encoded motionless video sequences, based on statistical averaging, may be about 80~90%. In contrast to the motionless case, for the sequences with big motion information, the average percentage of selecting skip and inter 16×16 modes as the best mode is over 50%. As a result, if the skip or inter 16×16 modes are determined early without performing an exhaustive rate distortion cost calculation, the processing time can be reduced dramatically.

Thus, an early termination condition for the motion compensation unit 245 in the video encoder 215 may be used to bypass a lengthy mode calculation process, without sacrificing video quality.

Based on the fact that large mode sizes such as skip and inter 16×16 are typically chosen for macroblocks in the homogeneous video content, while other smaller mode sizes are typically chosen for macroblocks in the video content with rich texture, the texture characteristics may be determined from the mode decision results of the original full-scale frames, and use the texture information to assist with the mode decision process for the down-scaled frames.

Figure 3:
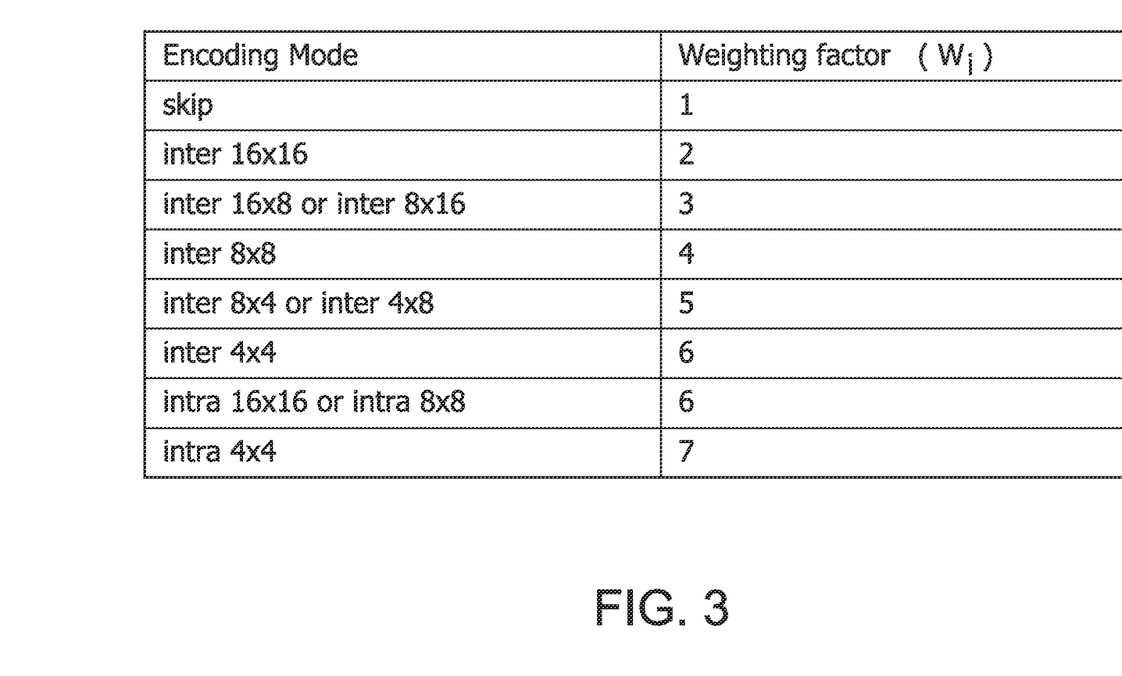
FIG. 3 shows a table of weighting factors for different macroblock modes in accordance with some embodiments.

FIG. 3 shows a table including examples of weighting factors ($W_i$) assigned to different macroblock encoding modes which may serve as texture character measurements. These weighting factors are based on a simple linear weighting model to indicate the expected ratio. The information shown in the table of FIG. 3 may be stored in a memory device, such as the memory 104 shown in FIG. 1, which may reside in the video encoder 215 of FIG. 2.

As shown in FIG. 3, a weighting factor of 1 ($W_i=1$) is allocated to a skip encoding mode of a macroblock in the full-scale frame, a weighting factor of 2 ($W_i=2$) is allocated to an inter 16×16 encoding mode of a macroblock in the full-scale frame, a weighting factor of 3 ($W_i=3$) is allocated to an inter 16×8 encoding mode or an inter 8×16 encoding mode of a macroblock in the full-scale frame, a weighting factor of 4 ($W_i=4$) is allocated to an inter 8×8 encoding mode of a macroblock in the full-scale frame, a weighting factor of 5 ($W_i=5$) is allocated to an inter 8×4 encoding mode or an inter 4×8 encoding mode of a macroblock in the full-scale frame, a weighting factor of 6 ($W_i=6$) is allocated to an inter 4×4 encoding mode of a macroblock in the full-scale frame, or an intra 16×16 encoding mode or an intra 8×8 encoding mode of a macroblock in the full-scale frame, and a weighting factor of 7 ($W_i=7$) is allocated to an intra 4×4 encoding mode encoding mode of a macroblock in the full-scale frame.

Setting a weighting factor of 6 ($W_i=6$) for both the inter 4×4 encoding mode and the intra 16×16 or intra 8×8 encoding mode is intentional. In video encoding, the inter 4×4 encoding mode or the intra 16×16 or intra 8×8 encoding mode is typically used for some scenes with big motion or huge details. Thus, the same weighting factor is allocated, but a higher factor may be used for the intra 4×4 encoding mode, which requires additional motion and details.

Figure 4:
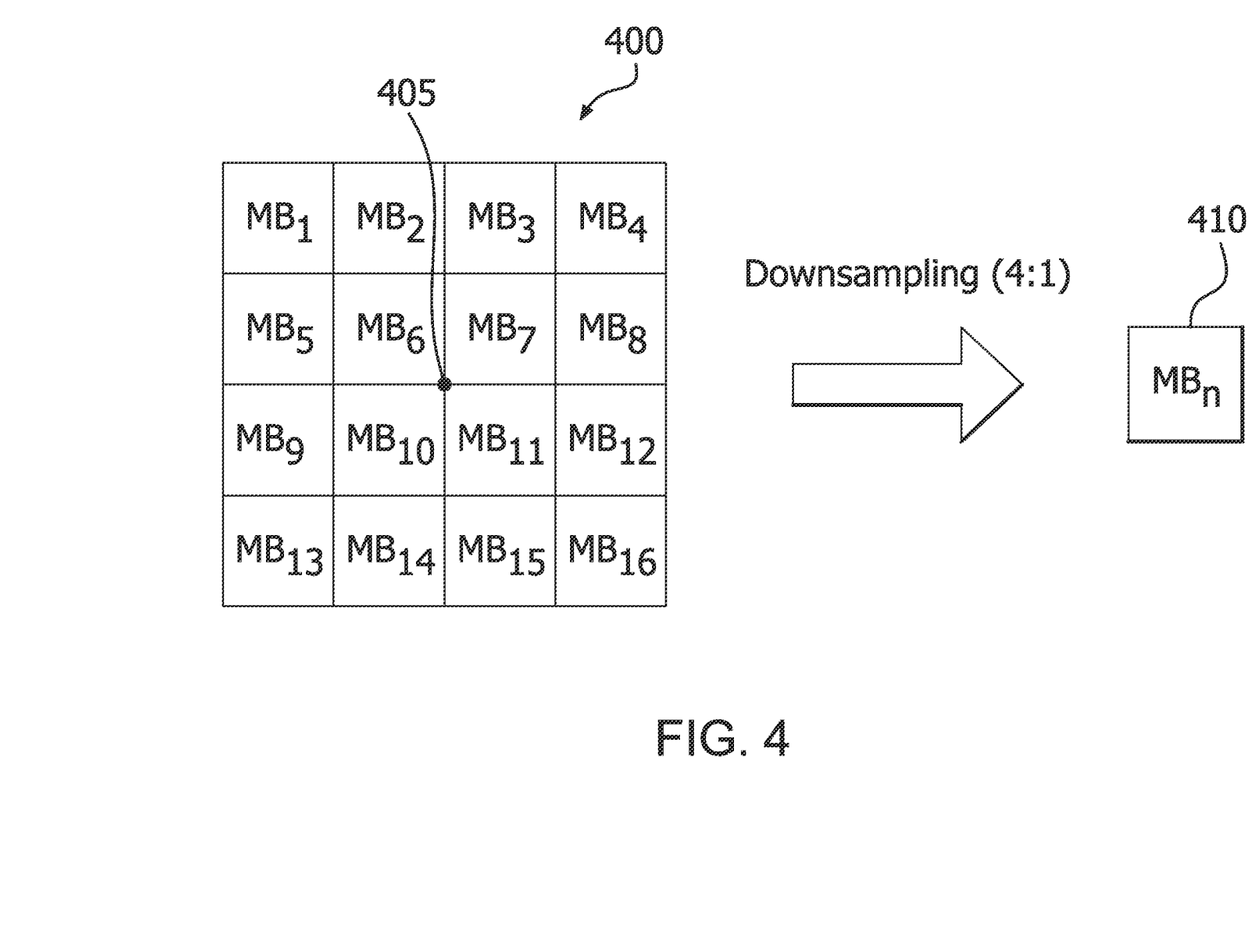
FIG. 4 shows an example of a macroblock correlation between a full-scale picture and a down-scaled picture in accordance with some embodiments.

FIG. 4 shows an example to illustrate the proposed mode decision algorithm whereby an original full-scale frame 400, including an area of sixteen macroblocks $MB_1$ to $MB_{16}$ having a center 405, is downsampled by a factor of 4 in both horizontal and vertical directions, to a down-scaled area 410 including $MB_n$. For each $MB_i$ (i=1 . . . 16) in the original full-scale frame, a corresponding weighting factor may be defined as $W_i$ (i=1 . . . 16) whose value may be looked up from the table in FIG. 3 based on encoding mode.

Figure 5:
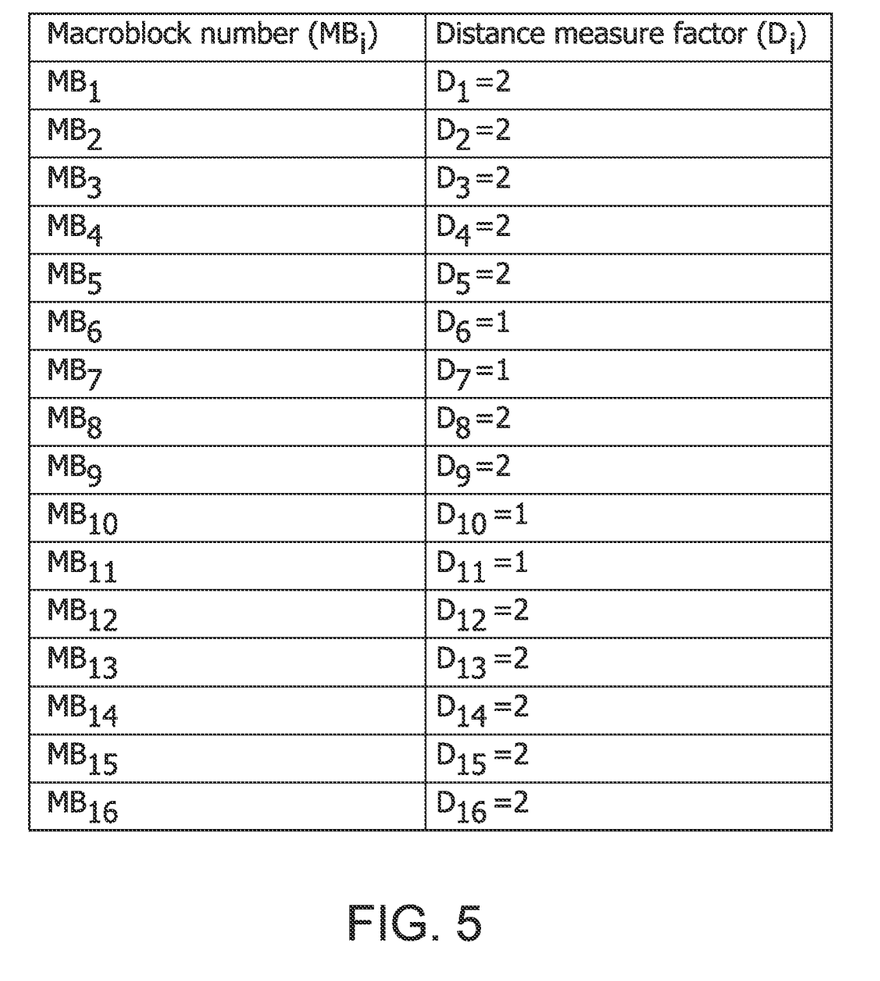
FIG. 5 shows a table indicating distance measure factors for different macroblocks in accordance with some embodiments.

FIG. 5 shows a simple example table of distance measure factors ($D_i$) based on the distance to the center of the down-scaled macroblocks (in FIG. 4 it is the center 405 of $MB_1$ to $MB_{16}$). Also, a distance measure factor, $D_i$ (i=1 . . . 16), may be defined for each $MB_i$ (i=1 . . . 16). The information shown in the table of FIG. 5 may be stored in a memory device, such as the memory 104 shown in FIG. 1, which may reside in the video encoder 215 of FIG. 2.

The distance measure factor may be based on whether a macroblock in a corresponding down-sized area is adjacent to a selected point (e.g., the center of this area) or is separated by at least one macroblock from the selected point. As shown in FIG. 5, a distance measure factor of 1 is allocated to macroblocks in the full-scale frame that are adjacent to the center of the corresponding down-sized area, and a distance measure factor of 2 is allocated to macroblocks in the full-scale frame that are separated from the center by one macroblock.

In one embodiment, an algorithm used by the motion compensation unit 260 of the encoder 210 shown in FIG. 2 may calculate the texture complexity for $MB_n$ in the down-scaled frame using the following formula:

$$TC_n = \sum_{i=1}^{16} (W_i \times D_i); \qquad \text{Equation (2)}$$

where $W_i$ is the mode weighting factor and $D_i$ is the distance measure factor for $MB_i$.

The overall complexity $TC_n$ may be compared to a predetermined threshold TH, which is configurable and, for example, may be initialized to a number based on statistical averaging for each category of pictures, (e.g., natural, synthetic, header, shoulder and the like) may be used to categorize pictures). For example, TH may be set to an initial value of 65 to estimate a number for the complexity weighting factor $W_i$ shown in FIG. 3 and the distance measure factor ($D_i$) shown in FIG. 5. Other initial values may depend on the complexity measure, which similarly may be changed, such as by using the variance of the texture in the block.

If $TC_n$ is smaller than TH, the texture complexity for $MB_n$ is regarded as low. In this case, the rate distortion calculation may be performed to only assess the skip and inter 16×16 modes, rather than the full set of modes, to select the best mode for $MB_n$ in the down-scaled frames. The threshold TH may be updated by multiplying it with a factor that is the ratio of the number of bits spent on the $MB_n$ with early exit condition to the average of the bits spent on its neighboring marcroblocks.

An efficient mode decision algorithm for H.264 based homogeneous video transcoding with spatial resolution conversion has been described. Compared to the regular transcoding implementation which performs motion compensated prediction on all of the supported modes to select the best prediction mode for every macroblock in the down-scaled frames, this mode decision algorithm effectively uses the mode selection result from the original full-scale frames to simplify the time consuming rate distortion optimization assessment for the downsized pictures. Such an assessment may benefit, for example, systems with limited processing power, or may assist in the handling of multiple encoding jobs.

Figure 6A:
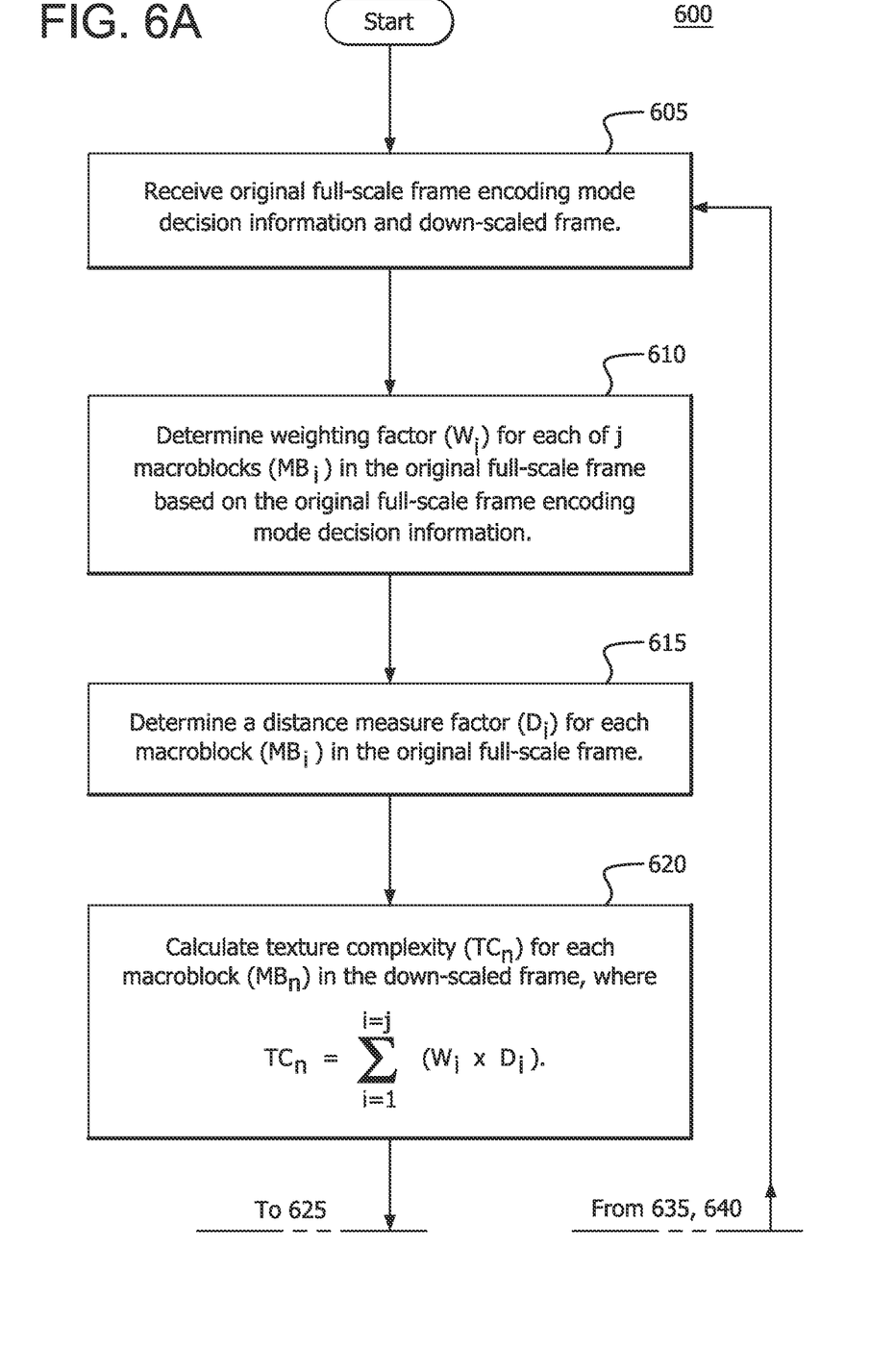
FIGS. 6A and 6B, taken together, are a flow diagram of a procedure for determining which encoding modes to use to process macroblocks in down-scaled frames in accordance with some embodiments.
Figure 6B:
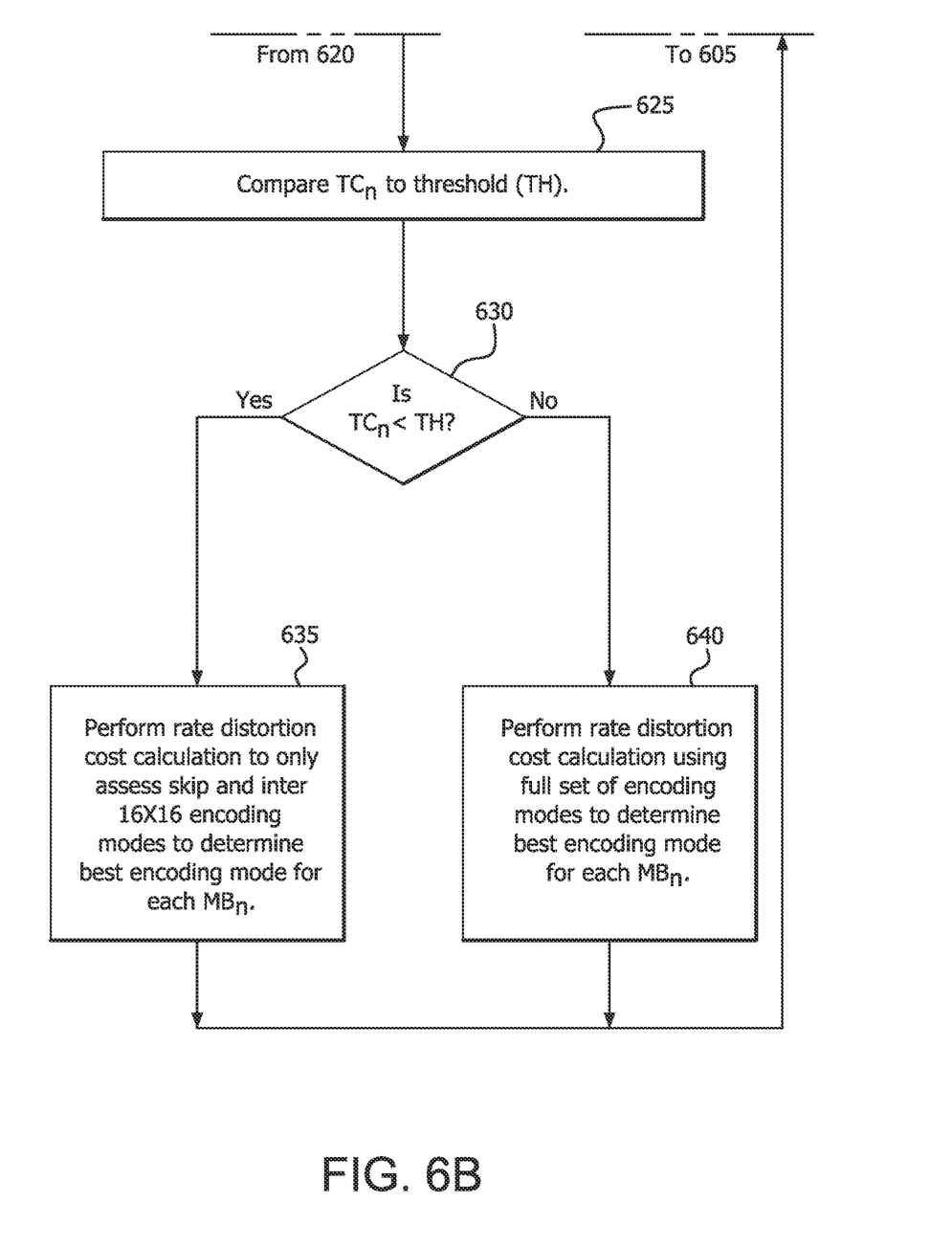

FIGS. 6A and 6B, taken together, are a flow diagram of a procedure 600 for determining which encoding modes to use to process macroblocks in down-scaled frames in accordance with some embodiments.

Referring to FIGS. 2 and 6A, the motion compensation unit 245 in the video encoder 215 receives original full-scale frame encoding mode decision information and a down-scaled frame from the downsampling unit 210 via signal 270 (605 in FIG. 6A). The motion compensation unit 245 determines a weighting factor ($W_j$) for each of j macroblocks ($MB_j$) in the original full-scale frame based on the original full-scale frame encoding mode decision information (610 in FIG. 6A). The motion compensation unit 245 also determines a distance measure factor ($D_j$) for each macroblock ($MB_j$) in the original full-scale frame (615 in FIG. 6A). The motion compensation unit 245 calculates the texture complexity ($TC_n$) for each macroblock in the down-scaled frame ($MB_n$) in accordance with Equation (2), (620 in FIG. 6A).

Referring to FIGS. 2 and 6B, the motion compensation unit 245 compares TCn to a predetermined threshold (TH), (625 in FIG. 6B). If the motion compensation unit 245 determines that $TC_n$ is less than TH (630 in FIG. 6B), the motion compensation unit 245 performs a rate distortion cost calculation to only assess skip and inter 16×16 encoding modes, (i.e., a subset of all available encoding modes used to evaluate the rate distortion cost to determine the best prediction mode), to determine the best encoding mode for each $MB_n$ (635 in FIG. 6B). If the motion compensation unit 245 determines that $TC_n$ is greater than or equal to TH (630 in FIG. 6B), the motion compensation unit 245 performs rate distortion calculation cost using a full set of encoding modes to determine the best encoding mode for each $MB_n$ (640 in FIG. 6B). The procedure 600 then returns to 605.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium does not include transitory signals. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing video encoding mode decisions, the method comprising:
receiving a down-scaled frame including at least one macroblock, wherein the down-scaled frame is associated with a full-scale frame having a plurality of macroblocks that have been downsampled;
determining a weighting factor for each of the macroblocks in the full-scale frame from stored predetermined information comprising a plurality of different weighting factors each corresponding to a different mode used to encode each of the macroblocks in the full-scale frame;
determining, for each of the plurality of macroblocks, a distance measure factor corresponding to a location of each of the plurality of macroblocks in the full-scale frame relative to a selected point adjacent to at least one of the plurality of macroblocks and excluded from each of the plurality of macroblocks; and
predicting an encoding mode to encode the at least one macroblock in the down-scaled frame based on the weighting and the distance measure factors.

2. The method of claim 1 further comprising:
generating a texture complexity for each macroblock in the down-scaled frame; and
determining which encoding modes to use to perform a rate distortion cost calculation based on the texture complexity of each macroblock in the down-scaled frame and a threshold.

3. The method of claim 1 wherein the distance measure factor determined for a corresponding macroblock of the plurality of macroblocks in the full-scale frame is (i) a first distance measure factor when the corresponding macroblock is determined to be one of the at least one macroblocks adjacent to the selected point and (ii) a second distance measure factor, different than the first distance measure factor, when the corresponding macroblock borders the at least one macroblock adjacent to the selected point and is separated from the selected point by the at least one macroblock.

4. The method of claim 3 wherein a first number value is allocated as the first distance measure factor for the at least one macroblock in the full-scale frame adjacent to the selected point.

5. The method of claim 4 wherein a second number value twice the first number value is allocated as the second distance measure factor for the corresponding macroblock that borders the at least one macroblock adjacent to the selected point and separated from the selected point by the at least one macroblock.

6. The method of claim 1 wherein a weighting factor of 1 is allocated to a skip encoding mode of a macroblock in the full-scale frame.

7. The method of claim 1 wherein the encoding modes include one or more of a skip encoding mode, an inter 16×16 encoding mode, an inter 16×8 encoding mode, an inter 8×16 encoding mode, an inter 8×8 encoding mode, an inter 8×4 encoding mode, an inter 4×8 encoding mode, an inter 4×4 encoding mode, an intra 16×16 encoding mode, an intra 8×8 encoding mode, or an intra 4×4 encoding mode.

8. The method of claim 1 wherein more than one of the encoding modes may be associated with the same weighting factor.

9. A video encoder motion compensation unit comprising:
a memory configured to store predetermined information comprising a plurality of different weighting factors each corresponding to a different mode used to encode each of a plurality of macroblocks in a full-scale frame;
a processor in communication with the memory and configured to:
receive a down-scaled frame including at least one macroblock, wherein the down-scaled frame is associated with the full-scale frame having the plurality of macroblocks that have been downsampled;
determine a weighting factor for each of the macroblocks in the full-scale frame from the stored predetermined information;
determine, for each of the plurality of macroblocks, a distance measure factor corresponding to a location of each of the plurality of macroblocks in the full-scale frame relative to a selected point adjacent to at least one of the plurality of macroblocks and excluded from each of the plurality of macroblock; and
predict an encoding mode for the at least one macroblock in the down-scaled frame based on the weighting factors and the distance measure factors determined for each of the macroblocks in the full-scale frame.

10. The video encoder motion compensation unit of claim 9 wherein
a texture complexity is generated for each macroblock in the down-scaled frame, and a determination is made as to which encoding modes to use to perform a rate distortion cost calculation based on the texture complexity of each macroblock in the down-scaled frame and a threshold.

11. The video encoder motion compensation unit of claim 9 wherein the distance measure factor determined for a corresponding macroblock of the plurality of macroblocks in the full-scale frame is (i) a first distance measure factor when the corresponding macroblock is determined to be one of the at least one macroblocks adjacent to the selected point and (ii) a second distance measure factor, different than the first distance measure factor, when the corresponding macroblock borders the at least one macroblock adjacent to the selected point and is separated from the selected point by the at least one macroblock.

12. The video encoder motion compensation unit of claim 11 wherein a first number value is allocated as the first distance measure factor for the at least one macroblock in the full-scale frame adjacent to the selected point.

13. The video encoder motion compensation unit of claim 12 wherein a second number value twice the first number value is allocated as the second distance measure factor for the corresponding macroblock that borders the at least one macroblock adjacent to the selected point and separated from the selected point by the at least one macroblock.

14. The video encoder motion compensation unit of claim 9 wherein a weighting factor of 1 is allocated to a skip encoding mode of a macroblock in the full-scale frame.

15. The video encoder motion compensation unit of claim 9 wherein the encoding modes include one or more of a skip encoding mode, an inter 16×16 encoding mode, an inter 16×8 encoding mode, an inter 8×16 encoding mode, an inter 8×8 encoding mode, an inter 8×4 encoding mode, an inter 4×8 encoding mode, an inter 4×4 encoding mode, an intra 16×16 encoding mode, an intra 8×8 encoding mode, or an intra 4×4 encoding mode.

16. The video encoder motion compensation unit of claim 9 wherein more than one of the encoding modes may be associated with the same weighting factor.

17. A non-transitory computer-readable storage medium configured to store a set of instructions for causing a computer to execute a method of performing video encoding mode decisions comprising:
receiving a down-scaled frame including at least one macroblock, wherein the down-scaled frame is associated with the full-scale frame having the plurality of macroblocks that have been downsampled;
determining a weighting factor for each of the macroblocks in the full-scale frame from stored predetermined information comprising a plurality of different weighting factors each corresponding to a different mode used to encode each of the macroblocks in the full-scale frame;
determining, for each of the plurality of macroblocks, a distance measure factor corresponding to a location of each of the plurality of macroblocks in the full-scale frame relative to a selected point adjacent to at least one of the plurality of macroblocks and excluded from each of the plurality of macroblocks; and
predicting an encoding mode for the at least one macroblock in the down-scaled frame based on the weighting factors and the distance measure factors determined for each of the macroblocks in the full-scale frame.

18. The non-transitory computer-readable storage medium of claim 17 wherein the instructions are Verilog data instructions.

19. The non-transitory computer-readable storage medium of claim 17 wherein the instructions are hardware description language (HDL) instructions.

* * * * *